UNITED STATES PATENT OFFICE.

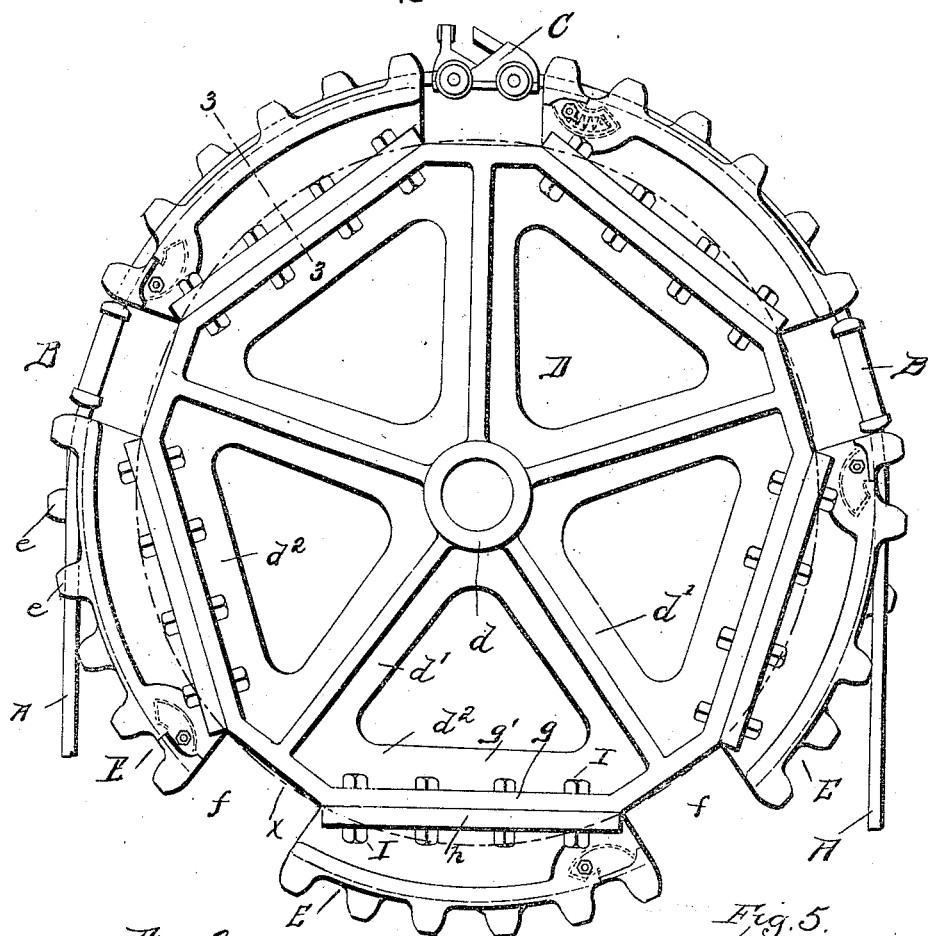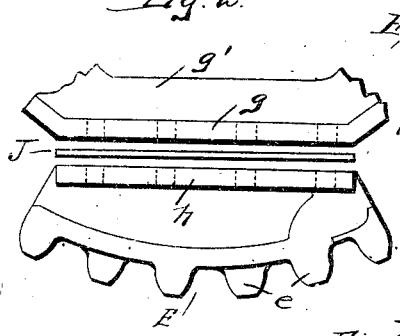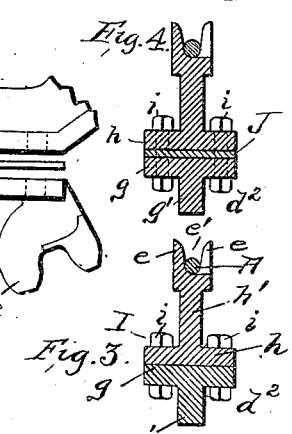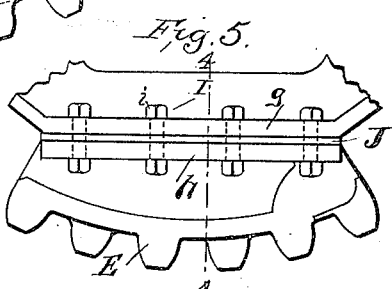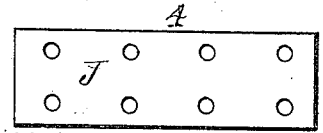

FREEMAN R. WILLSON, JR., OF WORTHINGTON, OHIO, ASSIGNOR, BY MESNE ASSIGNMENTS, TO THE JEFFREY MANUFACTURING COMPANY, A CORPORATION OF OHIO.

SPROCKET-WHEEL.

960,756.  Specification of Letters Patent.  Patented June 7, 1910.

Application filed August 30, 1905. Serial No. 276,392.

*To all whom it may concern:*

Be it known that I, FREEMAN R. WILLSON, Jr., a citizen of the United States, residing at Worthington, in the county of Franklin and State of Ohio, have invented certain new and useful Improvements in Sprocket-Wheels, of which the following is a specification, reference being had therein to the accompanying drawing.

This invention relates to power transmission apparatus in which a cable is employed as the endless traveling member; and it consists of improvements in the wheels with which the cable engages.

The advantages incident to the use of cables, in lieu for instance of chains, have long been recognized, but they are subject to this disadvantage, that the length of the cable is subject to considerable variation, owing to the stretching thereof under the conditions of severe and long continued use, as well as to expansion and contraction under the variations of temperature. Such changes of course affect the pitch of the cable and unless the pitch of the wheel with which the cable engages be varied, the cable and wheel do not work well together.

It is the object of my invention to produce a wheel for use in power transmission systems, that is simple in construction and is adapted to have its pitch changed by simple adjusting manipulations that can be effected by any workman and by the use of means that are always at hand.

In the accompanying drawings Figure 1 is a side elevation of a wheel embodying my invention. Fig. 2 is a view of one section of the wheel, the parts thereof being separated. Fig. 3 is a cross section taken on the line 3—3 of Fig. 1. Fig. 4 is a similar view to Fig. 3 except that the segment E has been set out by the use of a liner or shim-plate. Fig. 5 is a side view of a portion of the wheel when the segment E has been set out as indicated in Fig. 4. Fig. 6 is a detached face view of one of the liners or shim-plates.

In the drawings, A represents a cable, B the contact members or blocks applied thereto, and C flights or other conveying attachments secured to the cable and serving in lieu of the blocks B.

The wheel with which the cable engages comprises essentially a central portion D, which may be formed of cast metal, and a series of segments E secured thereto. The central portion of the wheel comprises a hub $d$, radiating arms $d'$ and the rim or peripheral portion $d^2$. This rim is divided into a number of sections formed with broad bearing surfaces upon which rest and to which are secured the separable segmental sections E. These separable segments constitute the parts of the wheel with which the cable directly engages, and they are separated from each by the gaps $f$. Each segment E is provided with a series of staggered teeth $e$ between which is a groove $e'$ in which rests the cable. The segments E and the gaps $f$ separating them are comparatively long, as is customary in wheels of this character adapted to be used with power transmitting cables; and the contact pieces or blocks B upon the cable occupy the gaps as the cable passes around the wheel.

It is evident that if a cable stretches the distance between adjacent blocks is increased, and it is therefore necessary, if the cable is to properly register with the wheel, that the pitch of the latter should be increased in proportion to the stretching of the cable. The bearing surfaces $g$ upon which the segments E bear are preferably planes coinciding with chords of a circle $x$ struck from the center of the wheel, while the bearing surface $h$ of each segment E is shaped to fit the surface $g$. These bearings $g$ and $h$ are relatively broad and are formed by laterally projecting flanges extending respectively from the web portion $g'$ of the peripheral part $d^2$ of the wheel and the web portions $h'$ of the segments, as clearly indicated in Fig. 3. The segments E are secured to the portion D of the wheel by bolts I passing through the flanges $g'$ and $h'$, and nuts $i$ therefor.

When it is desired to increase the pitch of the wheel, the segments E are loosened and shimming plates or liners J inserted between them and the adjacent bearing surfaces $g$. These cause the segments E to be set out in a radial direction, thereby increasing the pitch of the wheel.

It will thus be seen that not only is the wheel of simple construction, but the segments E may be adjusted to any desired extent by the very simple expedient of employing shimming plates (which can be found in all establishments, or manufactured out of metal at hand wherever machinery is being used,) the regular location of the bearing surfaces $g$ upon which the segments E rest permitting this.

The cable segments have broad seats or bearings upon which they are firmly secured whether adjusted to one position or another. And the adjustment is easily effected and is uniform for each segment, because of a single liner under each segment gives a uniform adjustment to each movable section of the wheel, two liners under each section gives another, but still uniform, adjustment to all the sections, and so on, and these adjustments can be made by any unskilled mechanic.

What I claim is:

The combination with a power transmission cable having sprocket engaging blocks, of a sprocket wheel comprising a central hub or frame section having a series of regularly arranged bearing surfaces formed by laterally projecting flanges extending respectively in opposite directions from the web portion of the hub or frame section, a series of separable segments separated from each other by gaps and each formed with a groove to be engaged by the cable, each adapted to engage at one end with one of the sprocket engaging blocks of the cable and each being formed with relatively broad bases, extending laterally from the web part of the segment in a direction transverse to the plane of the wheel and adapted to be supported by the bearing faces of the hub or frame section, liners between the bearing surfaces of the central hub and the separable sections, and rows of connecting bolts on each side of the segments and passing through the flanges of the segments and through the flanges of the hub or frame section, substantially as set forth.

In testimony whereof I affix my signature, in presence of two witnesses.

FREEMAN R. WILLSON, Jr.

Witnesses:
J. WEBSTER,
R. H. PAUSCH.